INVENTOR.
William F. Haack
BY

INVENTOR
William F. Haack
BY

ATTORNEY

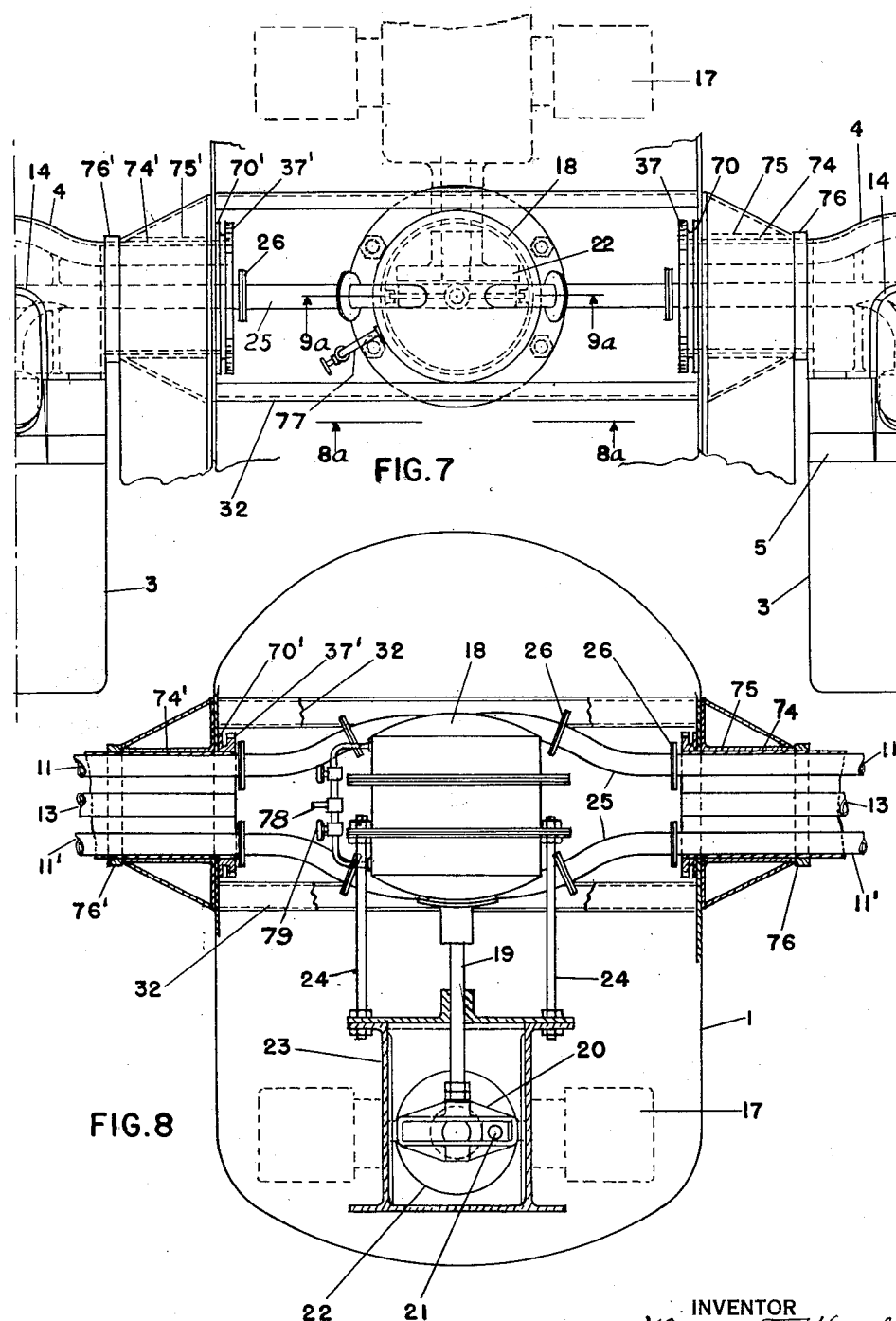

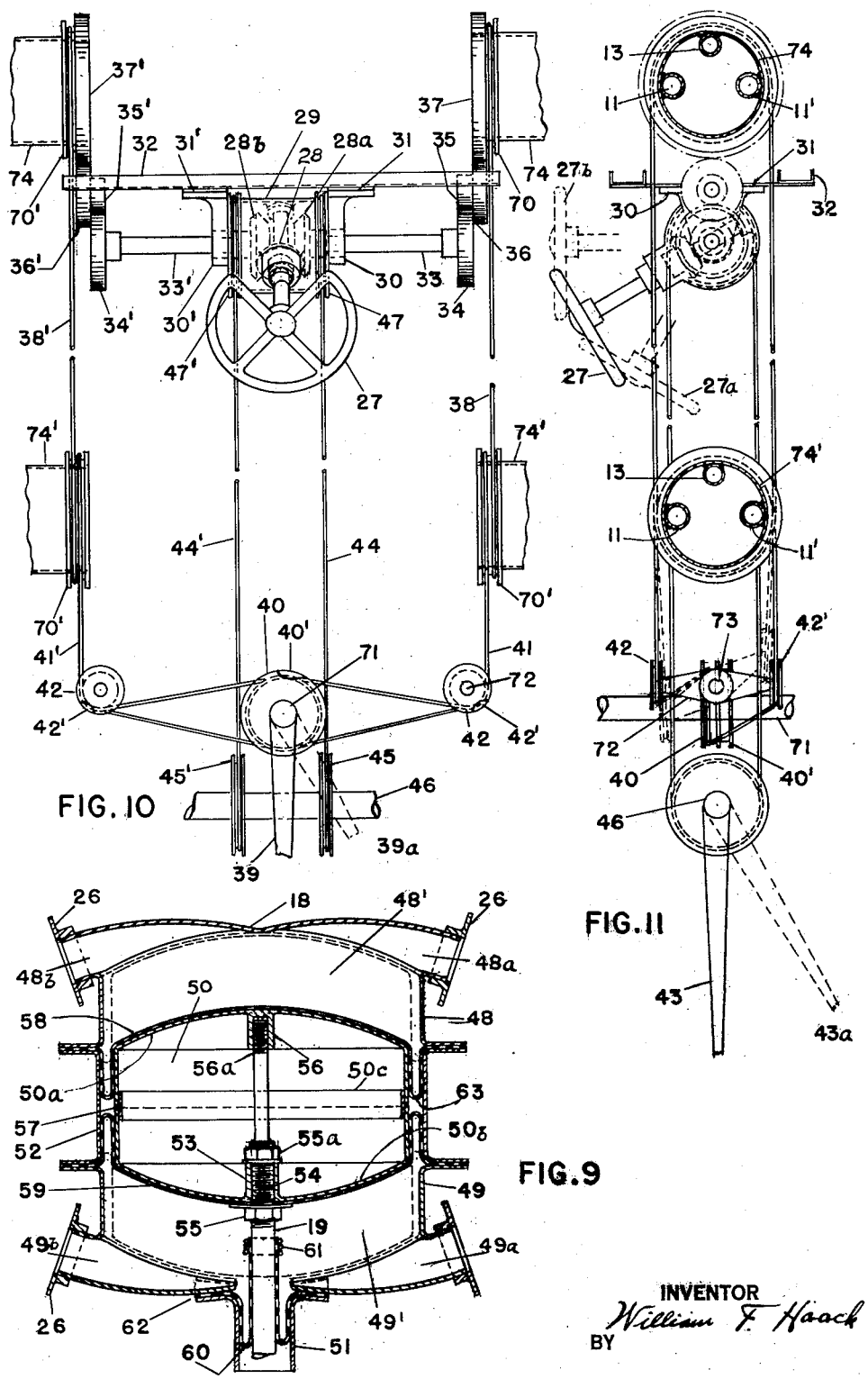

Patented July 11, 1950

2,514,639

UNITED STATES PATENT OFFICE 2,514,639

OSCILLATING VANE AIRCRAFT

William F. Haack, Fanwood, N. J.

Application August 31, 1945, Serial No. 613,848

3 Claims. (Cl. 244—72)

My invention relates to a new and novel oscillating vane aircraft.

The object of my invention is to provide a direct lift airplane, that can be used for short haul air travel, between starting points and final destinations, without spending time going to, and coming from, special landing fields or airports, miles removed from the starting point or destination. Such remoteness from an airport usually requires time consuming ground travel thru congested streets and thoroughfares, which in many cases, would neutralize the advantages gained thru air travel, especially for short hauls.

A further object of the invention is to overcome difficulties of torque and directional steering inherent in direct lift aircraft of the single propeller type.

A further object of the invention is to construct an airplane that will lift itself from the ground vertically, then permit the transfer of the vertical lifting force to the position of a horizontal propelling force for horizontal flight, with a wide range of forward speeds, the ability to hover in the air, take off and land in limited areas and serve as a general utility air car.

A further object of the invention is to construct an airplane wherein the propulsion member performs the triple function of vertical lift, horizontal propulsion and also acts as an efficient gliding surface.

A further object of the invention is the construction of a simple, cheap and easily operated aircraft that will require a minimum of skill.

My invention includes means for accomplishing direct lift, by flapping or oscillating vane members, in a new and novel manner.

It embodies mechanism for producing direct lift by means of a plurality of flexible lightweight rapidly oscillating vanes, said vanes being hingedly attached to the rearward edge of wing members, said wing members being rotatably mounted into the body of the plane, said vanes being set into a rapid oscillating motion by means of air pulses. The thrust created by the said vanes in rapid motion provides the lifting, or propelling force.

It embodies mechanism for rotating the wing members so as to direct the thrust of the rapidly oscillating vanes downward for vertical lift. Horizontal propelling force is obtained by positioning the vanes, by means of the rotatable wing members, so that the thrust is rearward.

It embodies novel means for actuating the vanes by air pulses applied alternately to opposite surfaces of the vanes. These said air pulses are supplied by a novel air compressor, which alternately compresses and then by a receding action, allows the air to decompress in a closed air circuit.

It embodies a novel compressor construction, consisting of a cylinder, a floating piston, surrounded by a flexible rubber casing arranged for telescoping, forming a seal against air leakage and eliminating the need for the usual lubricant.

It further embodies expansion mchanism at each vane, said expansion mechanism acting in unison with air pressure in the compressor chambers for actuating the vanes from a closed air circuit.

It further embodies a like number of vanes mounted on opposite wing members, with all vane expansion mechanisms actuating the downward movement of the vanes for a balanced set of wing members, connected to a common compressor chamber. Likewise, all vane expansion mechanisms actuating the vanes for the return movement are connected to a separate common compressor chamber. The pressure exerted at opposite sides of the plane thru the rapidly oscillating vanes are in balance, because of the common compressor connections. Said balance aids the lateral stability. When the vanes in motion meet unequal external air pressure, those vanes encountering increased air pressure will be restricted in their range of movement, and the range of movement of those vanes on the opposite side of the plane meeting lesser external air pressure, will be extended, with the result that an instant lateral balance is maintained at all times. The plane is controlled in flight, by controls actuating the movable wing members in connection with elevator and rudder surfaces.

It further embodies air compressors connected to conventional type engines, by means of a crank pin operating in a crosshead, which in turn is connected to a connecting rod, transmitting reciprocal motion to the compressor piston.

My preferred construction includes a tandem wing arrangement. Each pair of forward and rearward wings is served by a separate compressor set connected to an individual source of power. This provides flexibility for maintaining longitudinal stability in ascending or descending by varying the speed of vane oscillations, either on the forward or the rearward wing couple, thru a variation of engine speed.

The earlier attempts to utilize the principle of flapping or oscillating wings have been confined principally to constructions comprising a body with wings hinged at each side. Such wings were of heavy and complicated construction, actuated by mechanical connecting parts, which together with the large size of the wings, made rapid movement of them for beating the air, very difficult. Since a doubling of the speed of wings beating the air will quadruple the reactance pressure, it is desirable that the flapping or oscillating members be light in weight, combined with strength and of an area small enough that rapid motion may be obtained with a minimum of power expenditure.

This object is accomplished in my aircraft, by employing a plurality of flexible lightweight vanes, simple in construction, small in area, actuated by air pulses, said air pulses eliminating the necessity for weighty mechanical parts for transmitting power to the plurality of oscillating vanes, said plurality of vanes providing ample surfaces for gliding.

In general, the earlier aircraft construction employing the principle or flapping or oscillating wings, did not embody the ability for direct lift, but depended upon forward motion of the plane to gain lifting force. The ability for direct lift is provided in my aircraft by means of rapidly oscillating vanes whose thrust may be directed downward when ascending or descending.

In the drawings:

Figure 7 is a plan view of the compressor, air lines, and fragmentary wing construction at the body connection.

Figure 8 is a rear elevation of the air compressor, air line, and a partial cross section of wing construction taken at 8a, 8a Fig. 7.

Figure 9 is a cross sectional view of the air compressor construction taken at 9a, 9a Fig. 7 and shown detached from the plane connection.

Figure 10 is a plan view of the steering mechanism, shown in schematic form.

Figure 11 is a side view of the steering mechanism, shown in schematic form.

Figure 1:
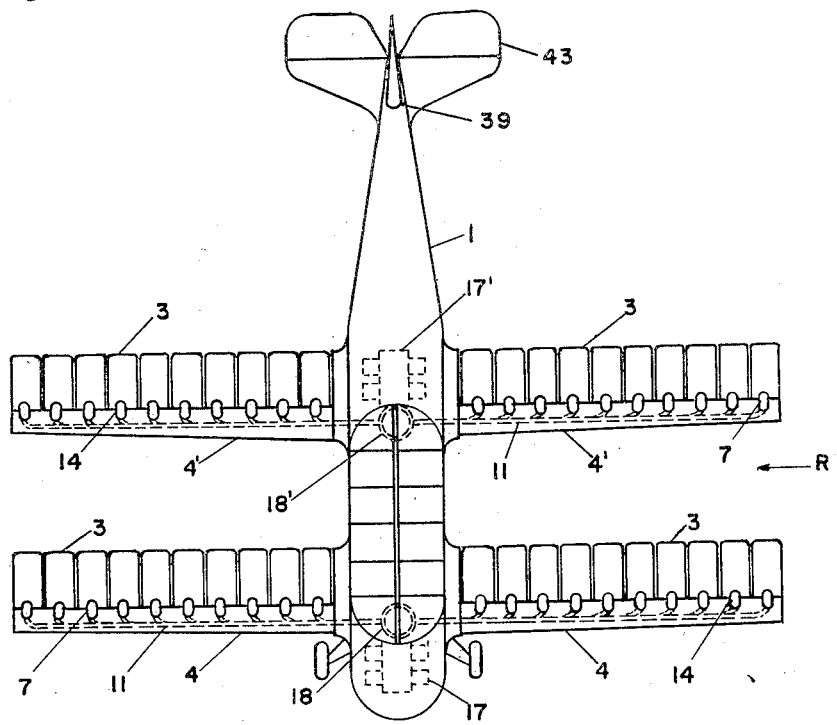
Figure 1 is a plan view of the direct lift aircraft.
Figure 2:
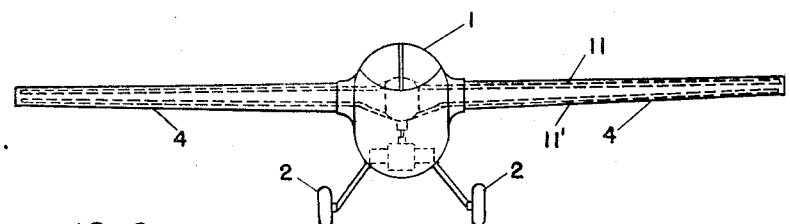
Figure 2 is a frontal view of the aircraft shown in Figure 1.

In the construction and operation of direct lift aircraft of the rotating propeller type, difficulties are encountered in such items as torque and directional control in flight, especially in the single propeller type plane. Torque is absent in my proposed aircraft, because of the absence of a rotating propeller. Likewise, the directional control is more positive, due to the ability to deploy extensive plane surfaces relative to the air currents when in flight.

The use of air pressure pulses as a means of operating or actuating lightweight vanes, permits the elimination of cumbersome mechanical construction, allows rapid movement, reduces total weight and provides a flexible means of transmitting power to remote locations with a minimum loss of power.

Air pulses from a common source, for actuating the vanes, provides a resiliency and means of balanced action not readily obtainable thru mechanical means.

The plural parts in the construction of the plane are identical, of light weight, simple of construction, having wide tolerances, and permitting of economical duplication thru mass production.

The directional controls are centered in a common control wheel governing both the vertical and the horizontal directions of flight.

As the transition of changing the thrust of the vanes from a vertical downward to a horizontal rearward direction progresses, in the act of ascending, forward motion is produced and then increased, creating a lifting force on the combined wing members, to replace that provided initially for lifting the plane. When the maximum forward speed has been reached, the plane is supported in flight by the aerodynamic action of the air currents on the combined wing members and vanes. The operation of landing the plane reverses the order of rotating the wing members so that the thrust of the rapidly oscillating vane is gradually changed from a horizontal direction to a vertical downward direction, slowing down the forward motion of the plane and allowing it to settle to the ground, or hover in the air over the ground.

As the relative speed of the air and the plane increases, the pressure encountered by the vanes in motion increases. This has the effect of limiting the angle of oscillation of the vanes, which in turn reduces the drag effect and is favorable to the forward movement of the plane. This said action is automatic, due to the resiliency of the air power by which the vanes are actuated.

When the plane is in a gliding position without power pulses, the vanes center themselves near midway in the arc of oscillation, on account of equal internal air pressure at both surfaces of the vanes. In this condition, the vanes absorb the shock of varying air currents and maintain lateral balance. An upward movement of vanes, caused by external air pressure on one side of the plane, is translated into an instant downward movement of the vanes on the opposite side of the plane, thru the common air line connection. In the case of a general upward air current, all vanes would be forced upward and remain there as long as the general upward pressure continued. When the external upward pressure ceased, the vanes would resume their near midway position by returning downward.

In case of a power failure, the plane may be controlled in a glide to a landing thru the manipulation of the extensive movable wing surfaces.

In such gliding action, lateral stability is aided by the flexible mounting of the vanes. Any upward pressure on vanes on one side of the plane will be counterbalanced by a downward movement of vanes on the opposite wing member thru the tendency of the upward movement of the vanes to compress the air in the common air connection.

In the drawing, a body car 1 rests on landing gear attached to wheels 2 and 2' when the plane is grounded.

Oscillating vanes 3 are attached to the rearward edge of wing members 4 and 4' by means of vane holding device 5 hingedly attached to shaft 6. Holding device 5 has a recessed end 5' to receive vane 3. Vane 3 is held in position in 5' by commercial screw fasteners not shown, allowing easy change or replacement of vanes.

Wing members 4 and 4' have cylindrical ends 74 and 74', rotatably mounted into the body of the plane by means of bearings 75 and 75', said wing members being held in position by collars 76 and 76' and the combination gear and pulleys 37, 70 and 37', 70'.

Figure 6:
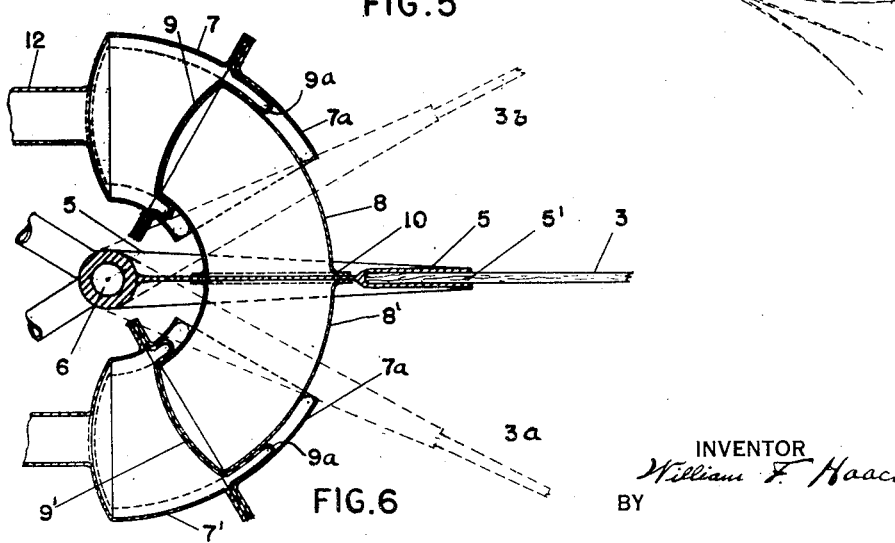
Figure 6 is an enlarged cross sectional view of the vane pulse mechanism taken at 6a, 6a Fig. 4.

Expansion chambers 7 and 7' are fitted with pistons 8 and 8' and sealed by flexible sleeves 9 and 9'. The flanges of 8 and 8' are fastened to vane holding device 5 at 10. Expansion chambers 7 and 7' are flanged and fastened to the flange of expansion chamber extensions 7a, securely clamping the flanges of 9 and 9' between said flanges, to form an air seal against leakage. Air pressure entering expansion chamber 7 will act on piston 8 forcing vane 3 downward in the direction of 3a Figure 6. When vane 3 has reached the end of the downward movement, air pressure entering expansion chamber 7' will force vane 3 in the direction of 3b. A rapid succession of such alternately applied air pulses acting on vane 3 sets said vane in rapid motion and thereby creates a propelling thrust.

A telescoping action of flexible members 9 and 9' takes place when pistons 8 and 8' are in motion. In the downward travel of piston 8, the flexible member 9 will recede from the outside surface of piston 8 and transfer to the inside surface of 7a thru the rolling action of fold 9a. A reverse action takes place on the upward movement of piston 8. A like movement occurs in flexible member 9' when piston 8' is in motion. The fold 9a of flexible members 9 and 9' are held in an expanded condition by the internal air pressure and allow free motion to pistons 8 and 8'.

It is realized that modifications to the pulse transmitting mechanism at the vanes may be embodied in my propulsion method in the form of accordion pleated flexible rubber cylinders, or plain or cupped flexible disks. My preferred telescoping construction of the flexible expansion mechanism shown, provides the maximum range of movement with the minimum amount of distortion of the flexible member and permits operation at maximum internal pressure.

Figure 3:
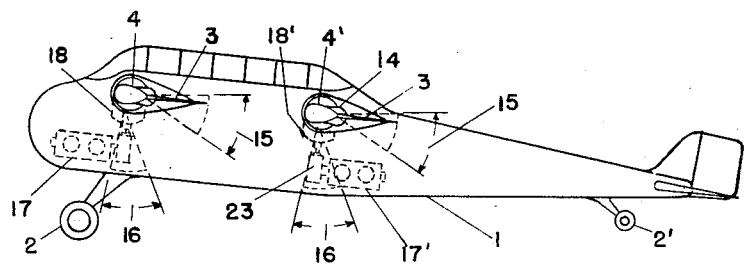
Figure 3 is a side view of my direct lift aircraft shown in Figure 1, viewed from direction R, showing the general position of vane movement for the vertical and for the horizontal thrust, and relative location of engines.
Figure 4:
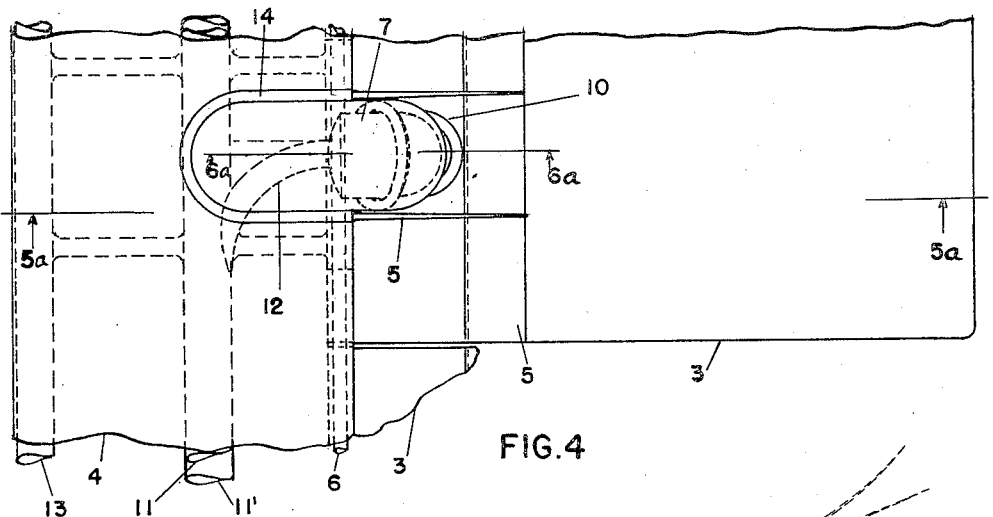
Figure 4 is an enlarged plan view of a fragmentary part of a wing and a partial vane in relation to the air pulse mechanism.
Figure 5:
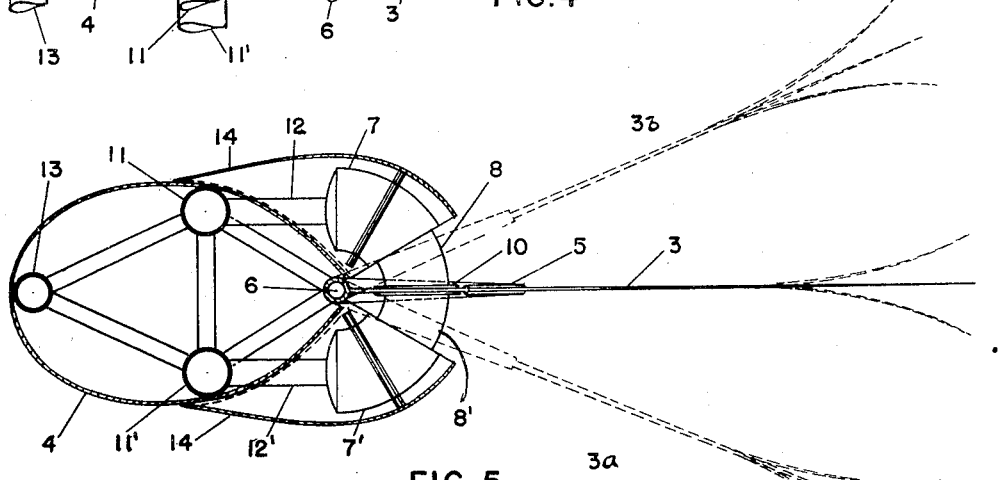
Figure 5 is a longitudinal cross section of a vane, and a transverse cross section of the wing member, taken at 5a, 5a Fig. 4, showing the relation to the vane pulse mechanism.

A simple straight form of vane 3 is shown. It is recognized that modifications to incorporate convex or concave surfaces in vane 3 can readily be adapted to give varying results when in motion. The vane 3, when in motion, oscillates thru approximately arc 15 when providing horizontal thrust for horizontal propulsion and thru arc 16 for lifting the plane. The said arcs of oscillation are indicated in Figure 3.

It is realized that there is a wide range of possible rates of oscillation for the vanes and a wide range of degrees of arc thru which said vanes may travel. The rate of oscillation will be governed by the speed of the engine, the power available, the number of vanes employed, the arc of oscillation, the length or radius of the vanes and their weight.

Expansion chambers 7 and 7' are connected to main air feed lines 11 and 11' by means of branch lines 12 and 12'. Main feed lines 11 and 11' are welded or otherwise fastened to the internal surfaces of 74 and 74'. Said air feed lines, in combination with tube 13, serve as longitudinal spar members for wing members 4 and 4', thereby adding simplicity and lightness to the plane. Cowlings for covering expansion mechanisms 7 and 7', in order to aid streamlining, are indicated by 14 and 14'.

The location of engines for actuating the forward and rearward compressors are indicated at 17 and 17'. Compression member 18 provides air pulses for the forward set of wings and compression member 18' provides air pulses for the rearward set of wings. The compressors are shown connected to the source of power thru connecting rod 19 and crosshead 20. Crosshead 20 is given a reciprocating motion by crank pin 21 which is connected to a rotating wheel 22 receiving power from engine 17. A housing for crosshead 20 and the engine connection are shown at 23, said housing providing means for adequate lubrication of the mechanical moving parts. Connection between the compressor and said housing is made by means of stays 24, providing necessary rigidity for holding the compressor and the source of power in co-operative relation.

Flexible connecting air lines 25 connect the compressor, by means of flanges 26 and 26', to main air feed lines 11 and 11'. Said flexible connecting air lines allow limited rotary movement of wings 4 and 4' for transferring the thrust of vanes 3 in rotational direction, from horizontal to vertical, or, in the reverse direction for changing the direction of the thrust of the vanes.

A cross section of compressor 18 taken thru 9a—9a Fig. 7 is shown in Figure 9, composed of upper compression chamber 48', lower compression chamber 49', double acting piston 50, connecting rod 19, upper outlets 48a and 48b and lower outlets 49a and 49b and connecting rod gland 51. The upper and lower compressor heads 48 and 49 are joined by means of flanges to midsection gland 52.

Piston 50 is of hollow construction to provide lightness and is composed of upper piston head 50a, lower piston head 50b, mounted on connecting rod 19. Reinforcing ring 50c is a bond between upper and lower piston heads 50a and 50b. An internal threaded gland 53 has been provided for 50b to engage threaded part 54 of connecting rod 19, holding 50b in place by means of nuts 55 and 55a. An internal threaded gland 56 has been provided for 50a, engaging threaded portion 56a on connecting rod 19. Upper piston head 50a is secured into position by screwing onto 19 at 56a and by welding 50c to 50a and 50b at 57.

A sheet rubber casing 58 is secured to the upper end of piston head 50a, looped down the side, folded back and upward and clamped between the flanges of 48 and 52, forming an air seal. A sheet rubber casing 59 is secured to the lower end of piston head 50b, looped up the side, folded back and downward and clamped between flanges of 52 and 49, forming an air seal for the lower compression chamber. The rubber casings 58 and 59 are not secured to the sides of 50a and 50b, in order to allow freedom of movement of piston 50. A sheet rubber sleeve 60 is secured to piston rod 19 at 61, said sleeve is looped downward, folded upward and clamped between lower compressor head 49 and gland 51 at 62, forming an air seal between movable connecting rod 19 and lower compression chamber 49'.

Compressor outlets 48a, 48b and 49a, 49b, are provided with flanges 26 for connecting the compressor to flexible feed lines 25, to allow movement between rotatable wing members 4 and 4' and stationary compressors 18 and 18'.

An inlet tube 77 is provided for admitting air under pressure thru inlet valve 78, into compression chambers 48' and 49', singly or jointly, by means of control valves 79.

An initial air pressure above atmosphere is maintained in the compression chambers under operating conditions. This said initial pressure forces the rubber casing against the piston and the inside wall of the compression chamber, keeping the fold 63 of the rubber in an expanded condition. In operation, the upward movement of piston 50 causes the vertical wall of rubber casing 58 to transfer from the inside surface of gland 52 to the outside vertical surface of piston 50, thru a rolling action of rubber fold 63. The reverse action of the rubber casing takes place in the downward movement of piston 50. A corresponding action of rubber casing 59 and rubber sleeve 60 takes place when piston 50 is in motion.

The upward piston stroke compresses the air for the downward movement of vane 3, and the downward piston stroke compresses the air for the upward movement of said vanes. As pressure is built up in the upper compression chamber, pressure is reduced in the lower compression chamber. The reverse action takes place during the return stroke. The rapid reversal of pressures reaching the vane expansion chambers 7 and 7', thru main feed line 11 and 11' and branch feed lines 12 and 12', set the vanes into an oscillating motion in unison with the speed of the compressor.

The compressor, as set forth, is designed to operate with a minimum of friction, and without the usual need of a lubricant between moving parts. The only friction of moving parts present in the compressor is the internal friction of the rubber bending in the fold. However, excessive heat is not generated on account of this action because it is a well known fact that rubber, in stretching, gives off heat, and on contracting to normal, cools. The alternate action of stretching and contracting to normal neutralizes the temperature effect. A similar condition of neutralized temperature takes place in the action of alternate compression and expansion of air in the closed compression circuit. The temperature of the air is raised when compressed and lowered when expanded, thus tending to keep the temperature near the normal range.

The directional control of the plane in flight is accomplished thru a common steering wheel 27. A clockwise turning of the control wheel 27 will cause the plane to turn to the right when in motion. A counterclockwise turning of steering wheel 27 will cause the plane to turn to the left. Pushing the control wheel 27 thru a forward arc will cause the angle of the vanes to be elevated and cause the plane to take a downward course. Pulling the control wheel 27 partly backward will lower the angle of the vanes and cause the plane to lift or rise. An extreme backward pull of control wheel 27 will retard the forward speed of the plane and place it in a position for vertical lift or hovering, or prepare it for landing or take off in a limited area. The plane may also take off or land in the conventional manner by means of a horizontal run on a runway, by omitting to rotate the wing members to a position of vertical lift.

The common steering wheel is connected to a differential gear train consisting of miter gears 28, 28a and 28b, enclosed in gear casing 29. Gear casing 29 is rotatably mounted in supporting brackets 30 and 30', said brackets being rigidly secured to cross braces 32 and 32' by means of supporting members 31 and 31'. Horizontal shafts 33 and 33' extend to and receive spur gears 34 and 34'. Spur gear 34 engages gear train composed of gears 35, 36 and 37. Likewise, spur gear 34' engage gear train 35', 36' and 37'. A clockwise partial rotation of steering wheel 27 will carry thru gears 28, 28a, 28b, 34, 35, 36 and 37, causing right front wing member 4 to rotate counterclockwise when viewed from the right side of the plane, reducing the forward propelling force, increasing the drag and causing the plane to turn to the right. The same movement of steering wheel 27 actuating the right forward wing 4 will also actuate the left forward wing 4 in a reverse rotary direction, causing the angular position of the vanes, which in normal horizontal flight are inclined slightly downward, to move upward, directing the center of the vane thrust into a more nearly horizontal direction, increasing the forward propelling force and aiding the turning of the plane to the right.

In the tandem wing arrangement shown, the right rear wing 4' is rotatably connected to right forward wing 4 by means of endless cable 38 which encircles grooved pulley 70 on forward wing 4 and also encircles grooved pulley 70' on rear wing 4'. A point of cable 38 is securely fastened to a point on the outer surface of the groove of pulley 70 and, likewise, a point of cable 38 is securely fastened to a point on the outer surface of the groove in pulley 70' so that movement of pulley 70 on front wing 4 will be transmitted to pulley 70' on rear wing 4' causing both wings on the same side of the plane to move in unison. Likewise, left front wing member 4 is rotatably connected to left rear wing member 4' by means of endless cable 38', causing the rear wing to follow the rotary movement of the forward wing.

Rudder 39, shown schematically, is connected by means of cables 41 and 41' to grooved pulley 70' on the circular end 74' of right and left rear wing 4' and to grooved pulleys 40 and 40' on rudder shaft 71. A right or left rotary movement of steering wheel 27 is transmitted into a right or left movement of rudder 39, assisting the plane to turn to the right or left. Cables 41 and 41' pass over guide pulleys 42 and 42' mounted on opposite ends of rotatable equalizing arm 72, pivotably mounted at 73, allowing movement of elevator 43 without affecting the rudder movement when steering wheel 27 is moved forward or backward.

The partial backward or forward movement of steering wheel 27 will cause pulleys 47 and 47' on rotatable gear casing 29 to rotate, transmitting rotary motion to pulleys 45 and 45', causing elevator 43 to be moved downward or upward. Said backward or forward rotary movement of steering wheel 27 will not cause a movement of rudder 39 thru cables 41 and 41', as the movement of cables 41 and 41' being pulled in the same direction by right and left pulleys 70' is compensated for thru the movement of guide pulleys 42 and 42', mounted on 72 and pivoted at 73. The supports of pivot 73 are not shown in the schematic presentation.

Rear elevator 43 is rotatably connected to rotatable gear case 29 by means of cables 44 and 44' engaging pulleys 45 and 45' mounted on elevator shaft 46 and engaging pulleys 47 and 47' mounted on rotatable gear casing 29.

A backward rotary movement of gear casing 29 by means of steering wheel 27 toward the position of 27a will rotate the vanes of all wings downward simultaneously and cause elevator 43 to rotate on shaft 46 in the direction of 43a. This position of the control mechanism causes the plane to assume an attitude for rising or vertical lift. Rotating the steering wheel 27 forward toward the position of 27b has the reverse effect and causes the plane to assume the attitude for descending.

The relative position of said vanes and said elevator as described, will tend toward keeping the plane on a level attitude when ascending or descending while in forward motion. It is realized that, by reversing the relative rotation of elevator 43 on shaft 46 in respect to gear casing 29 by crossing of cables 44 and 44' between pulleys 45 and 47 and between pulleys 45' and 47', the direction of movement of elevator 43 would be upward, or away from the direction of 43a. This would increase the maneuverability of the airplane in the vertical plane when in flight, because the position of elevator 43 would be accentuating the upward or downward change in the course of the plane's flight.

It will be understood that my invention is not limited to the details of construction illustrated and described except as appears in the claims.

I claim:

1. An aircraft comprising, in combination, a body, a power source therein and a vane driving air compression pump including a cylinder, a double acting piston operative therein by said power source, and a piston sealing means composed of continuous sheets of pliant material extending between the interior of the cylinder wall and the heads of said piston with an annular fold formed between the adjacent surfaces thereof; wing structures including an air foil leading edge extending laterally from said body and mounted thereon to rotate on a transverse axis; propulsion means including a plurality of flexible vanes horizontally hinged thereto with their tips extending rearwardly to form a trailing edge; means for oscillating said vanes including arcuate cylinders mounted in said wing structure above and below said vane hinges, arcuate double ended pistons operative in said cylinders mounted on said vanes, and mobile sealing means between said pistons and cylinders composed of sheets of pliant material attached to the inner wall of each cylinder extending in an annular fold between said parts; and over each piston head; means for transmitting power from said power driven piston and cylinder to said vane operating pistons and cylinders including tubes connecting the upper end of the power driven cylinder to the upper ends of the wing oscillating cylinders; and tubes connecting the lower end of the power driven cylinder to the lower ends of the wing oscillating cylinders, said tubes having flexible portions to permit rotation of said wing structures, and air enclosed and compressed in said cylinders and tubes operatively connecting the top of said power driven cylinder with the upper vane oscillating cylinders, and the bottom of said power driven cylinders with the lower vane oscillating cylinders; together with means for rotating said wing spars on a transverse axis relative to said body to attain control of the propulsive effect of the vanes.

2. Aircraft of the oscillating vane type, including in combination, a body car, an engine mounted therein, a double acting air compression pump operated by said engine having a cylinder, and a piston operatively driven therein adapted to provide air pulses alternately from the upper and lower end of said cylinder; wing spars extending laterally from said body car having air foil leading edges and trailing edges composed of a plurality of oscillatable vanes, horizontally hinged on said spars along the length thereof, and means for operating said vanes to attain propulsive effect, including double ended pistons mounted on said vanes, cylinders in said wing spar adapted to receive the upper and lower portions of said pistons, respectively in air tight relation, and tubular connections between the upper end of said engine driven cylinder and said cylinders which receive the upper ends of said pistons attached to said vanes, and the lower end of said engine driven cylinder and said cylinders which receive the lower ends of said vane pistons filled with compressed air so that oscillating movement of said engine driven piston is communicated to the pistons on said vanes.

3. In an aircraft of the oscillating vane propelled type, means for maintaining lateral stability including a plurality of oscillatable vanes horizontally hinged on wing spars extending laterally from each side of a centrally positioned body car in combination with means for operating said vanes including a power driven air compressor pump having a vertically disposed cylinder, a piston operative therein, and tubular connections to its upper end and its lower end; cylinders having pistons adapted to oscillate said vanes; a pipe centrally connected to the tubular connection at the upper end of said pump cylinder, extending transversely of said craft and connected to the upper ends of all said vane operating cylinders; a pipe centrally connected to the tubular connection at the lower end of said pump cylinder, extending transversely of said craft and connected to the lower ends of all of said vane operating cylinders, whereby retardation of the oscillating operation of vanes on one lateral spar will increase the oscillatory driving power applied to the vanes on the opposite wing spar.

WILLIAM F. HAACK.

REFERENCES CITED

The following references are of record in the file of this patent:

UNITED STATES PATENTS

| Number | Name | Date |
| --- | --- | --- |
| 153,846 | Reynolds | Aug. 4, 1874 |
| 971,358 | Clawson | Sept. 27, 1910 |
| 1,502,153 | Mills | July 22, 1924 |
| 1,625,012 | Worman | Apr. 19, 1927 |
| 1,679,356 | Gruenwald | Aug. 7, 1928 |
| 1,846,992 | Decker | Feb. 23, 1932 |
| 1,865,744 | Cornelius | July 5, 1932 |
| 1,920,447 | Tilly | Aug. 1, 1933 |
| 2,126,661 | Provinson | Aug. 9, 1938 |
| 2,286,452 | Worth | June 16, 1942 |

FOREIGN PATENTS

| Number | Country | Date |
| --- | --- | --- |
| 116,914 | Great Britain | June 19, 1918 |
| 312,160 | Great Britain | Aug. 11, 1930 |